(12) United States Patent
El-Barbari et al.

(10) Patent No.: US 8,772,965 B2
(45) Date of Patent: Jul. 8, 2014

(54) SOLAR POWER GENERATION SYSTEM AND METHOD

(75) Inventors: Said Farouk Said El-Barbari, Freising (DE); Oliver Gerhard Mayer, Munich (DE); Robert Roesner, Unterfoehring (DE); Christof Martin Sihler, Hallbergmoos (DE); Simon Herbert Schramm, Munich (DE)

(73) Assignee: General Electric Company, Niskayuna, NY (US)

( * ) Notice: Subject to any disclaimer, the term of this patent is extended or adjusted under 35 U.S.C. 154(b) by 398 days.

(21) Appl. No.: 12/825,417

(22) Filed: Jun. 29, 2010

(65) Prior Publication Data

US 2011/0316342 A1 Dec. 29, 2011

(51) Int. Cl.
*H02J 1/00* (2006.01)
*H02J 3/00* (2006.01)
(52) U.S. Cl.
USPC .......................................................... 307/71
(58) Field of Classification Search
USPC ................ 307/43, 45, 71, 77, 82; 136/244
See application file for complete search history.

(56) References Cited

U.S. PATENT DOCUMENTS

| 2002/0038667 | A1* | 4/2002 | Kondo et al. ................ 136/293 |
| 2009/0079383 | A1 | 3/2009 | Fornage et al. |
| 2009/0179500 | A1 | 7/2009 | Ragonese et al. |
| 2009/0189574 | A1 | 7/2009 | Le et al. |
| 2009/0261655 | A1* | 10/2009 | Kernahan ...................... 307/77 |
| 2011/0198935 | A1* | 8/2011 | Hinman et al. ................ 307/80 |

FOREIGN PATENT DOCUMENTS

WO 03007464 A2 1/2003

OTHER PUBLICATIONS

Martina Calais, Lawrence J. Boyle, Vassilios G. Agelidis and Michael S. Dymond; "Control Aspects of a Transformerless Five Level Cascaded Inverter Based Single Phase Photovoltaic System"; Downloaded from internet:<http://www.iee.or.jp/trans/pdf/2001/0104D_437.pdf>;T.IEE Japan, vol. 121-D, No. 4, 2001; pp. 437-444.
Ertl et al.; "A Novel Multicell DC-AC Converter for Applications in Renewable Energy Systems"; IEEE Transactions on Industrial Electronics, vol. 49, No. 5, Oct. 2002; pp. 1048-1057.
Akihiko Iwata and Hiromitsu Takahashi; "Gradationally Controlled Voltage Inverter and Its Applications";Downloaded from the internet<http://global.mitsubishielectric.com/company/rd/advance/pdf/vol113/vol113_tr3.pdf>: Mitsubishi Electric Advance Mar. 2006; pp. 6-8.

* cited by examiner

*Primary Examiner* — Carlos Amaya
(74) *Attorney, Agent, or Firm* — Nitin N. Joshi

(57) ABSTRACT

A power generation system includes integrated photovoltaic (PV) panels. Each of the integrated PV panel includes photovoltaic cells, a junction coupler coupling the photovoltaic cells in series, in parallel, or in combinations thereof, output terminals, and a DC to AC converter coupled between the junction coupler and the output terminals. The DC to AC converter includes switching devices and the integrated PV panels are coupled in series at the respective output terminals. A controller is provided in the power generation system for generation switching command signals for the switching devices of the integrated PV panels to synthesize an output voltage of the power generation system.

15 Claims, 7 Drawing Sheets

US 8,772,965 B2

SOLAR POWER GENERATION SYSTEM AND METHOD

BACKGROUND

This invention relates generally to electrical energy conversion and, more specifically, to connection of photovoltaic modules to a power grid or a load.

With the rising cost and scarcity of conventional energy sources and concerns about the environment, there is a significant interest in alternative energy sources such as solar power and wind power. Solar power generation uses photovoltaic (PV) modules to generate electricity from the sun. Multiple PV cells are connected electrically to one another in such systems.

When connecting a number of such PV cells, significant wiring and cabling are used. Additional cabling and connections are required when a direct current to direct current (DC to DC) converter is used along with a direct current to alternating current (DC to AC) converter to transmit the generated electricity from the PV modules to a load or to a power grid. Additionally, in embodiments including multiple DC to DC converters, increased power losses occur and larger filters are used due to the voltage output signals of DC to DC converters having higher harmonic components.

Therefore, there is a need for an improved, solar power transmission system to address one or more aforementioned issues.

BRIEF DESCRIPTION

In accordance with an embodiment of the present invention, a power generation system including integrated photovoltaic (PV) panels is provided. Each PV panel includes photovoltaic cells, a junction coupler coupling the photovoltaic cells in series, in parallel, or in combinations thereof, output terminals, and a DC to AC converter coupled between the junction coupler and the output terminals. The DC to AC converter includes switching devices and the integrated PV panels are coupled in series at the respective output terminals. The power generation system further includes a controller for generating switching command signals for the switching devices of the integrated PV panels to synthesize and output voltage of the power generation system.

In accordance with another embodiment of the present invention, a PV energy power system installation method is provided. The method includes connecting integrated PV panels and coupling the connected integrated PV panels to a grid or a load. Each integrated PV panel includes photovoltaic cells, a junction coupler coupling the photovoltaic cells in series, in parallel, or in combinations thereof, output terminals, and a DC to AC converter comprising switching devices coupled between the junction coupler and the output terminals.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
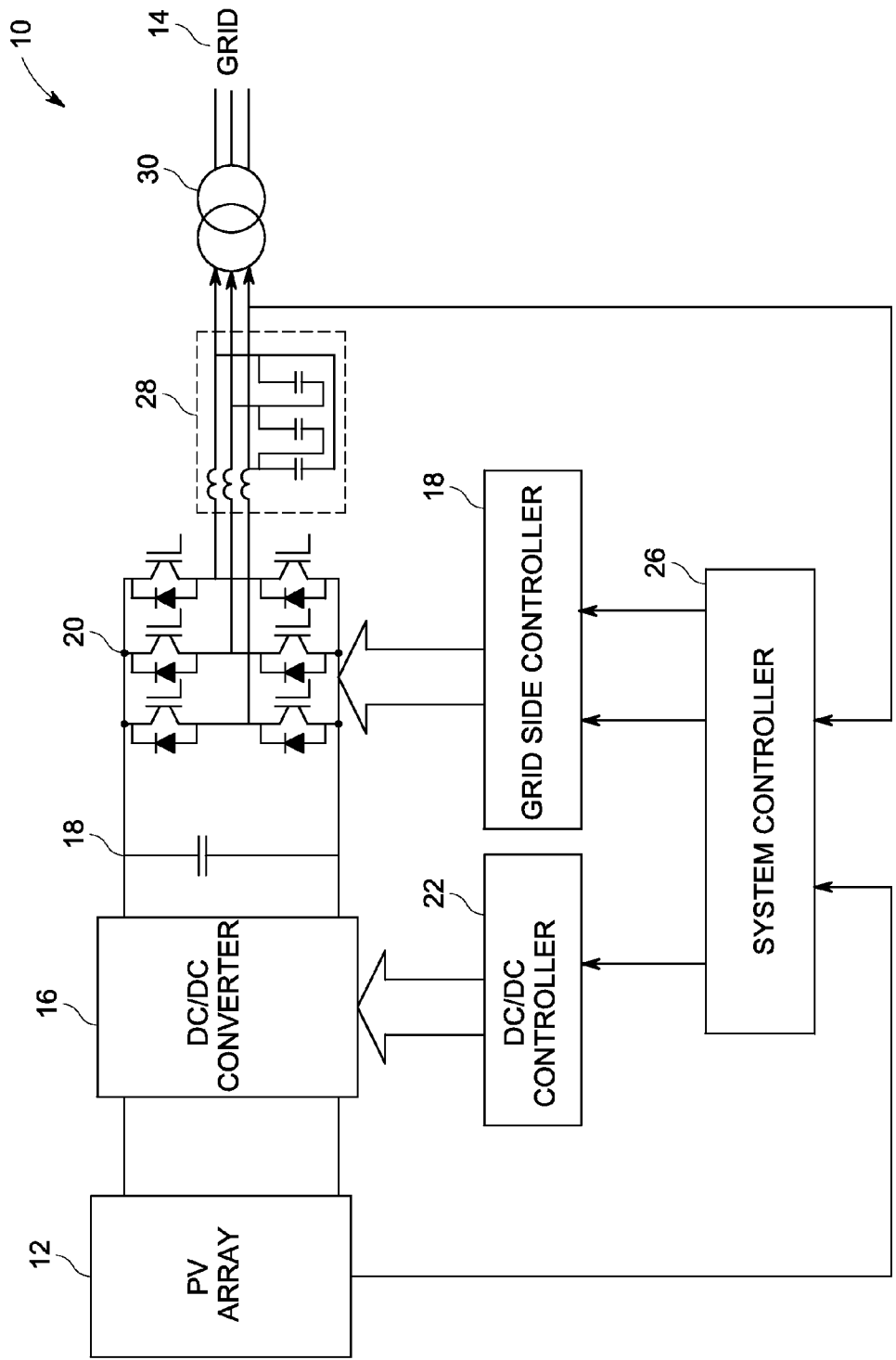
FIG. 1 is a schematic illustration of a conventional solar power generation system.

FIG. 1 illustrates a conventional solar power generation system 10. The power generation system includes a PV array 12 including a plurality of connected PV modules (not shown). The PV array is connected to a power grid 14 through a DC/DC converter 16, a DC link 18, and a grid side three-phase DC/AC converter 20. In other systems, the grid side three-phase converter may be replaced by multiple single-phase converters. The DC/DC converter 16 maintains a constant DC voltage at the DC link 18, and thus the energy flow from the PV module 12 to the power grid 14 is managed. The DC/DC converter 16 is controlled by a DC/DC controller 22, and the grid side converter 20 is controlled by a grid side controller 18. A system controller 26 generates a reference DC voltage command, a reference output voltage magnitude command, and a reference frequency command for the DC/DC converter 16 and the grid side converter 20 respectively. In other systems, a single controller may be used for the multiple control functions shown in FIG. 1. Filters 28 are used in the system for removing harmonics from the system output power, and transformer 30 is used for matching grid side converter output voltage to the grid voltage. Power grid 14 may comprise a utility grid or any other system of connecting power generation systems and loads.

Figure 2:
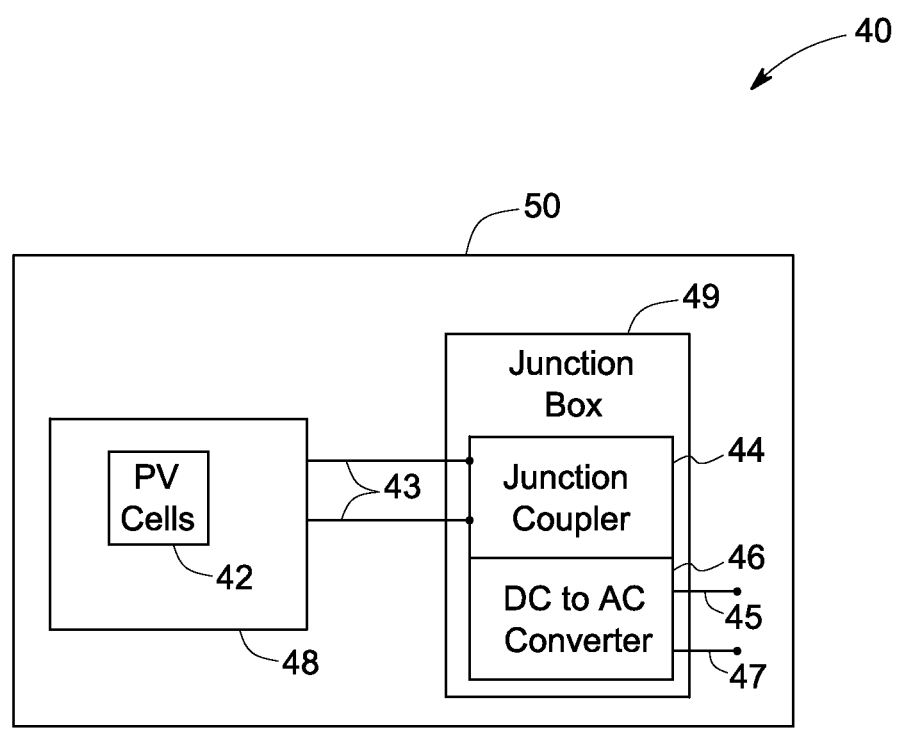
FIG. 2 is a diagrammatical representation of an integrated photovoltaic panel in accordance with an embodiment of the present invention.

FIG. 2 illustrates an integrated PV panel 40 in accordance with an embodiment of the present invention. Integrated PV panel 40 includes a plurality of PV cells 42 and a junction box 49 integrated into one packaging unit. Junction box 49 includes a junction coupler 44 and a DC to AC converter 46. PV cells wiring or cabling 43 is provided to the junction coupler 44 which is utilized to connect PV cells 42 in parallel to provide a higher current and in series to provide a higher voltage. DC to AC converter 46 converts DC power supplied by plurality of PV cells 42 into an AC power at the output terminals 45 and 47 which will further be supplied to a power grid (not shown). Integrated PV panel 40 may be encapsulated with a tempered glass or some other transparent material 48 on the front surface, and with a protective and waterproof material on the back surface (not shown). The edges are sealed for weatherproofing, and an aluminum frame 50 may be used for holding everything together in a mountable unit.

Figure 3:
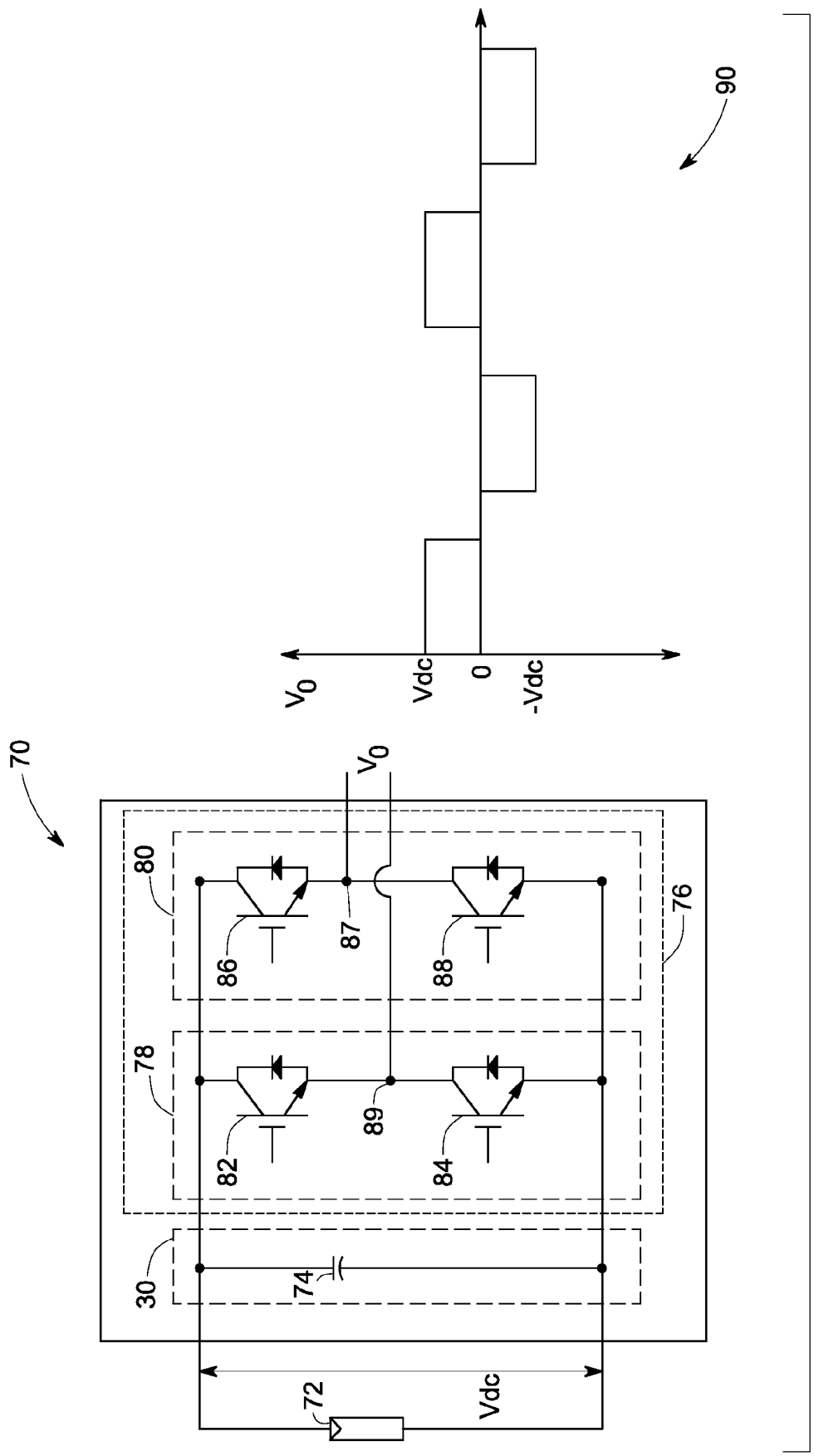
FIG. 3 is a diagrammatical representation of an integrated photovoltaic panel used in an embodiment of the present invention along with its output waveform.

FIG. 3 illustrates an integrated photovoltaic (PV) panel 70 used in one embodiment of the present invention along with its output waveform 90. Integrated PV panel 70 includes PV module 72, a DC link 74 and a H-Bridge DC to AC converter 76. PV module 72 includes a plurality of PV cells connected in series or parallel or combinations thereof through a junction coupler 44 (FIG. 2). As described earlier, junction coupler 44, DC link 74 and H-Bridge DC to AC converter are all part of a junction box (shown as element 49 in FIG. 2). DC energy from the PV cells is utilized to charge DC link 74, and then it is transferred to a load or a grid (not shown) through H-Bridge DC to AC converter 76. H-Bridge DC to AC converter 76 includes two phase legs 78, 80, and each of the legs includes two switching devices connected in series. For example, switching devices 82 and 84 of leg 78 are connected in series, and similarly switching devices 86 and 88 of leg 80 are connected in series. The output voltage Vo of H-Bridge DC to AC converter 76 is measured at mid points 87 and 89 of the series connection of the phase leg switching devices. Switching pulses for switching device 82 and 84 are complementary of each other so that, when the switching device 82 is conducting, switching device 84 is not conducting and vice versa. Similarly, switching devices 86 and 88 are complementary. It should be noted that the switching devices described herein may comprise devices such as Insulated Gate Bipolar Transistors (IGBTs), Insulated Gate-Commutated Thyristors (IGCTs), Metal-oxide Semiconductor-Controlled Thyristors (MCTs), Metal-oxide Semiconductor turn-off Thyristors (MTOs), and Metal-oxide Semiconductor Field-effect Transistors (MOSFETs), for example. Such devices may be fabricated from any suitable semiconductor material with silicon and silicon carbide being two non-limiting examples. Thus, in one embodiment, the switching devices may comprise silicon carbide devices. An advantage of silicon carbide devices is that these devices function under high temperature, high power and high radiation conditions.

In operation, H-Bridge DC to AC converter 76 has three switching stages. In the first switching stage, switching devices 84 and 86 are turned on, and switching devices 82 and 88 are turned off. Assuming the DC link voltage to be equal to Vdc, the output voltage Vo becomes Vdc. In the second switching stage, switching devices 82 and 86 are turned on while switching devices 84 and 88 are turned off. In this stage, V0 is equal to zero. In one embodiment, the second switching stage is achieved by turning on switching devices 84, 88 and turning off switching devices 82, 86. In the third switching stage, switching devices 82 and 88 are turned on while switching devices 84 and 86 are turned off. This results in Vo becoming −Vdc as shown in output waveform 90. Thus, it can be seen that the phase voltage Vo has three voltage levels Vdc, −Vdc, and 0.

Figure 4:
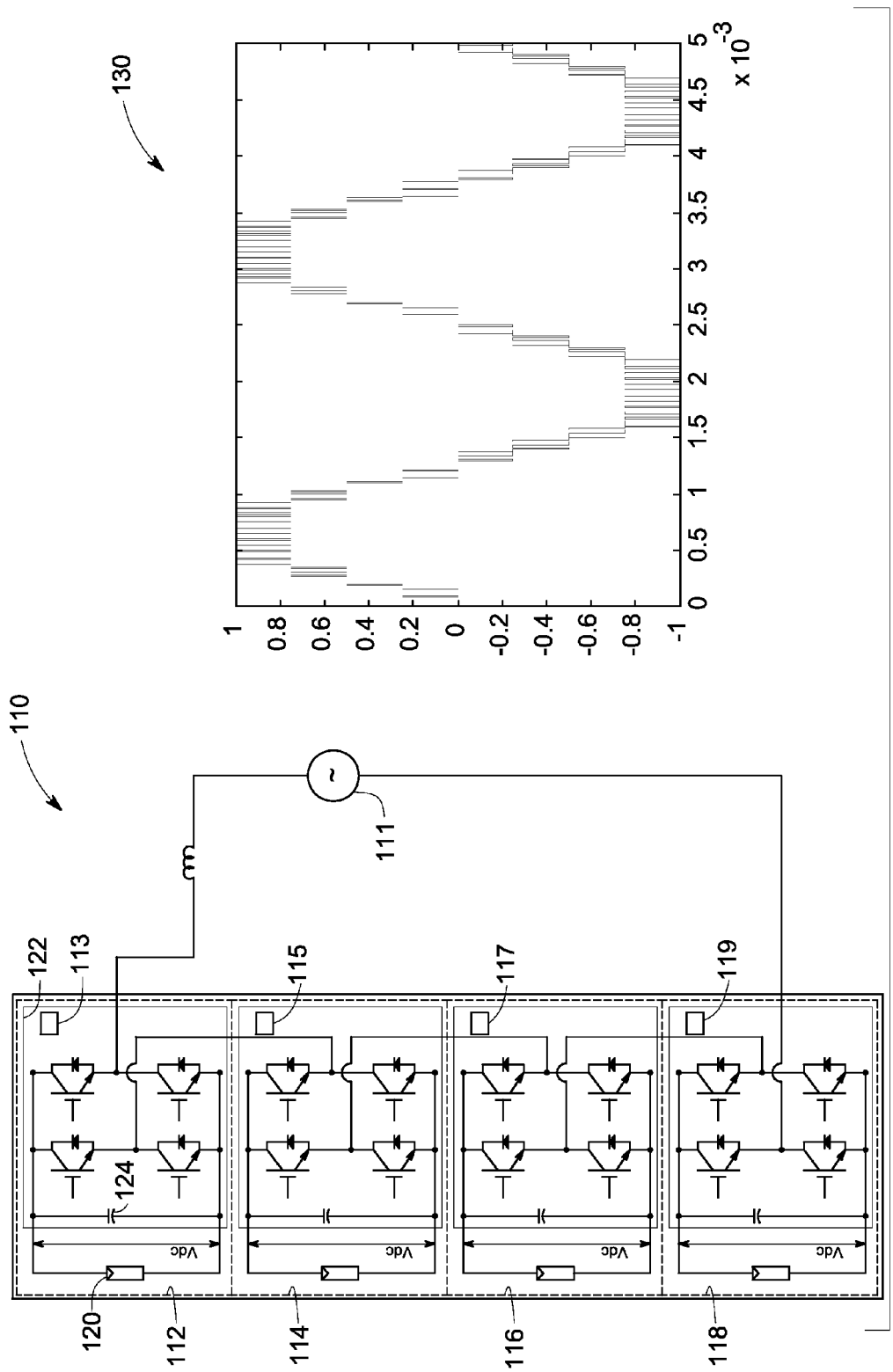
FIG. 4 is a diagrammatical representation of a single phase structure of a power generation system and its output voltage waveform in accordance with an embodiment of the present invention.

FIG. 4 illustrates a single phase structure of a power generation system 110 utilizing a plurality of integrated PV panels of the type described with respect to FIG. 3 and an output voltage waveform 130. Power generation system 110 supplies power to a grid 111 and includes a string of plurality of integrated PV panels 112, 114, 116 and 118 connected in series for higher voltages. In one embodiment, multiple strings of series connected integrated PV panels are connected in parallel for higher currents. As in FIG. 3, each integrated PV panel includes an integrated package with a PV module 120 coupled to a H-Bridge DC to AC converter 122 through a DC link 124. AC outputs of each of the H-Bridge converters are connected in series such that the synthesized output voltage waveform 130 is the sum of the H-Bridge converter outputs. The number of levels m in output voltage is given by m=2s+1, wherein s is a number of integrated PV panels utilized in the system 110. For example, in the figure shown, there are 4 integrated PV panels; hence output voltage 130 has total 9 levels.

In operation, each of the integrated PV panels generates a positive, negative, and zero voltage level for a defined duration. However, the durations for each of the voltage levels for each of the converter components are varied over a period of time to ensure that all of the integrated PV panels are utilized and the total harmonic distortion in output voltage 130 is minimized. In one embodiment, a pulse width modulation (PWM) technique is used for each of the integrated PV panels to further reduce the total harmonic distortion. This results in a near sinusoidal waveform as shown in output voltage waveform 130. Further, since the output voltage has reduced harmonics, filter requirements are reduced so that smaller filters (not shown in FIG. 4) may be used.

In one embodiment, individual maximum power point tracking (MPPT) controllers 113, 115, 117 and 119 are used to determine the maximum power point for the voltage-current (V-I) characteristics of integrated PV panels 112, 114, 116, 118 and to operate the integrated PV panels 112, 114, 116, 118 close to the maximum power point at all times. It should be noted that the grid voltage Vac affects the DC link voltage Vdc of each of the integrated PV panels. Thus, each MPPT controller 113, 115, 117 and 119 provides a reference current command for a respective H-Bridge DC to AC converter such that the maximum power is acquired from the integrated PV panel. It will be appreciated by those skilled in the art that the MPPT controllers may include perturbation and observation algorithms or incremental conduction algorithms. As described earlier, integrated PV panels 112, 114, 116 and 118, along with associated MPPT and any other controllers may be integrated into a single packaging unit.

Figure 5:
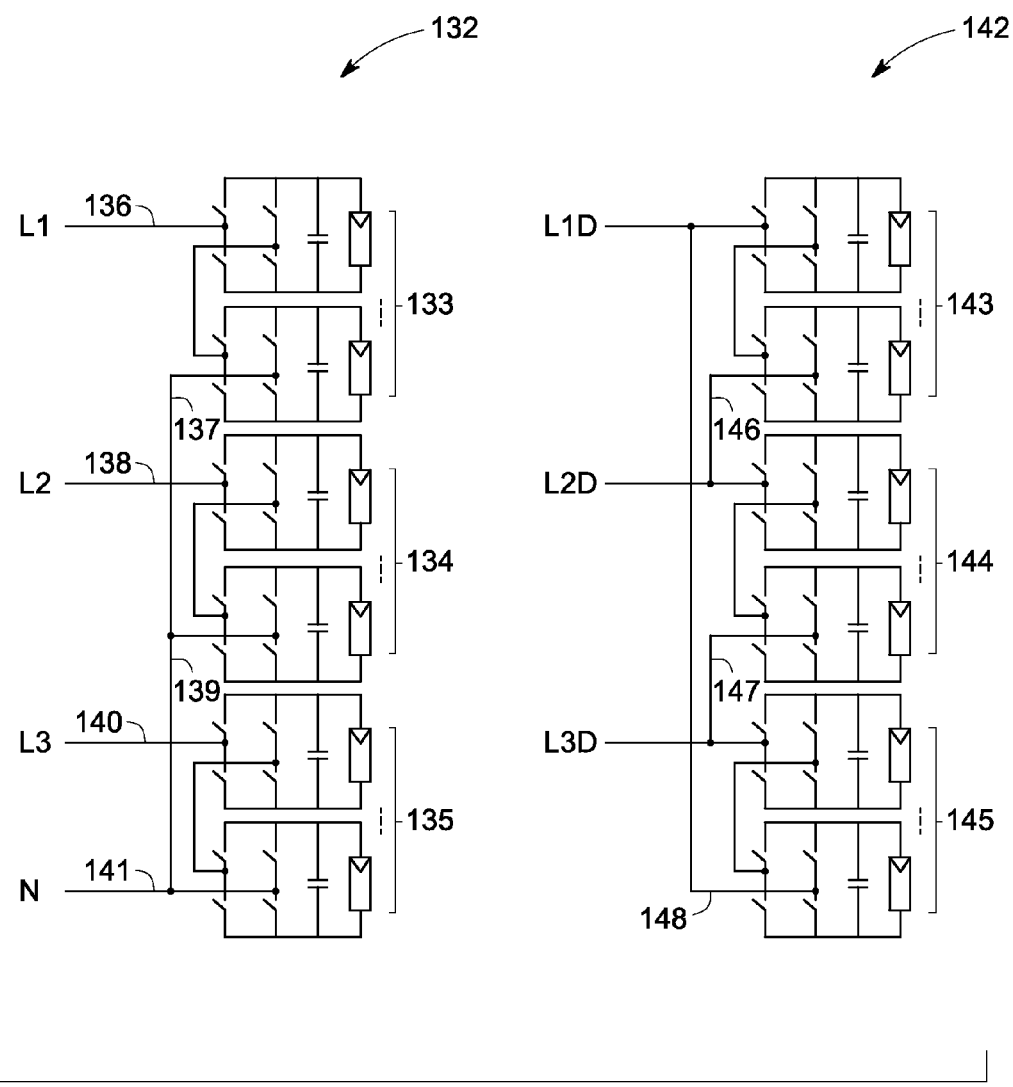
FIG. 5 is a diagrammatical representation of three phase structures of integrated PV panels in accordance with embodiments of the present invention.

FIG. 5 illustrates three phase structures 132, 142 of integrated PV panels in accordance with embodiments of the present invention. Three phase structure 132 includes three pairs or three strings of integrated PV panels 133, 134 and 135 connected in a star arrangement. Each pair of integrated PV panels inside a string is connected in series and has two output terminals, 136-137 for pair 133, 138-139 for pair 134 and 140-141 for pair 135 respectively. Output terminals 137, 139 and 141 are connected to each other at a neutral N. The remaining output terminals of the three pairs i.e., 136, 138 and 140 are three phase outputs and are labeled as L1, L2, and L3 respectively.

Three phase structure 142 includes three pairs of integrated PV panels 143, 144 and 145 connected in a delta arrangement. Each pair of integrated PV panels is connected in series as in the arrangement of 132, and three phase outputs for the structure 142 are taken at three phase terminals L1D, L2D, and L3D which are one of the output terminals for each of the pairs. The remaining output terminal of each of the pairs 146, 147, 148 is connected to a three phase output terminal of the next pair. For example, for pair 143, the second output terminal 146 is connected to three phase output terminal L2D of the pair 144.

One advantage of the embodiments of FIG. 5 is that integrated PV panels of structures 132 and 142 may be connected to grid 111 either with or with without a transformer of the type shown in FIG. 4, depending on whether the output voltage can be controlled to sufficiently match the grid voltage without a transformer.

Figure 6:
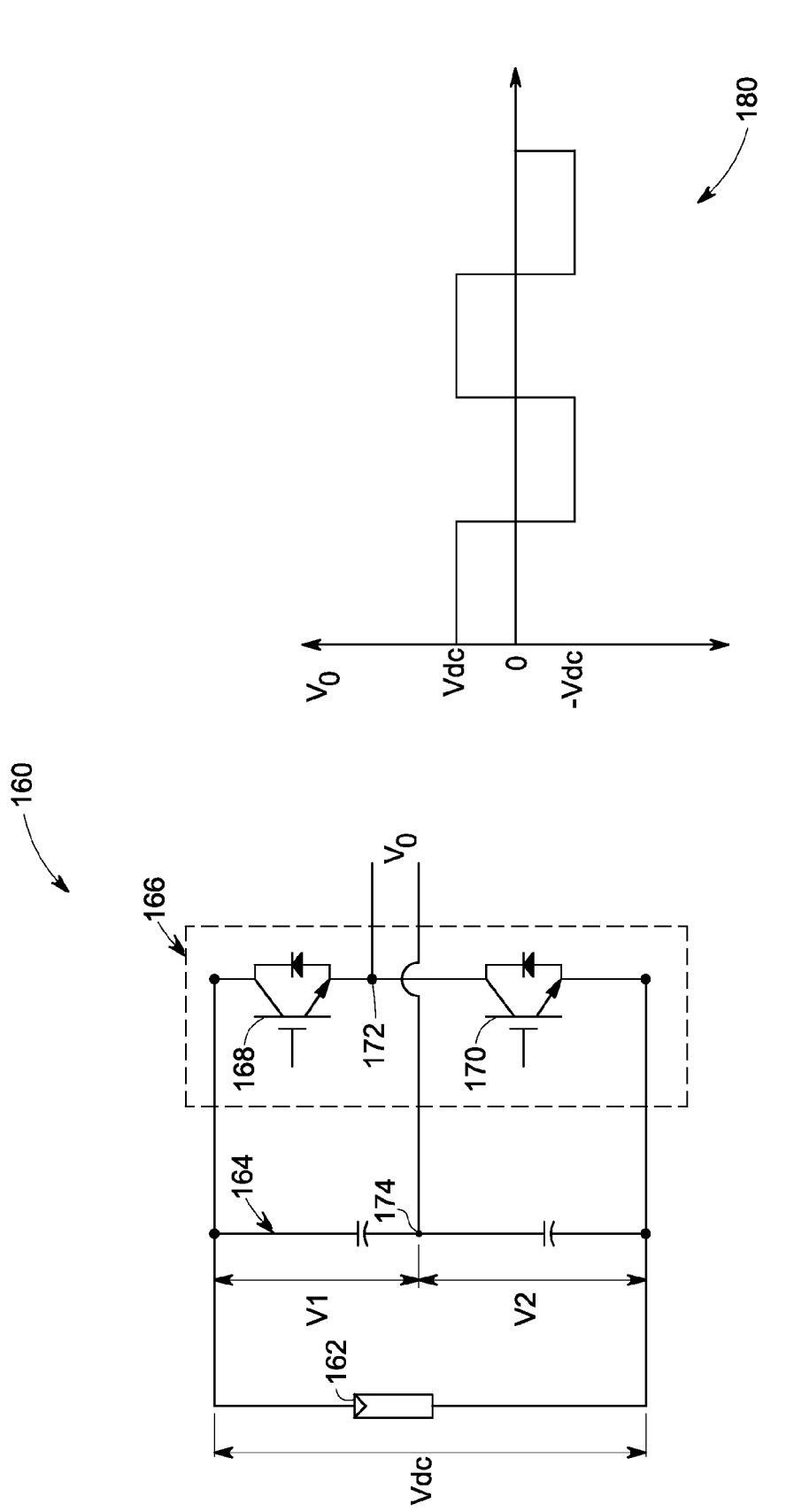
FIG. 6 is a diagrammatical representation of another integrated PV panel used in an embodiment of the present invention along with its output voltage waveform.

FIG. 6 illustrates another integrated PV panel 160 used in one embodiment of the present invention along with its output voltage waveform 180. Integrated PV panel 160 includes a PV module 162, a split DC link 164 and a half bridge DC to AC converter 166. Half bridge DC to AC converter 166 includes two switching devices 168, 170 connected in series. The output voltage Vo of half bridge DC to AC converter 166 is measured at mid points 172 and 174 of the series connection of the switching devices and the split DC link respectively. As described earlier, switching devices 168, 170 may comprise devices such as IGBTs, IGCTs, MCTs, MTOs, and MOSFETs and may comprise silicon or silicon carbide, for example.

In operation, half bridge DC to AC converter 166 has two switching stages. In the first switching stage, switching device 168 is turned on, and switching device 170 is turned off. Assuming a stable operation, V1=V2=Vdc/2, and Vo becomes Vdc/2. In the second switching stage, switching device 170 is turned on while switching device 168 is turned off. In this stage, Vo is equal to −Vdc/2 as shown in output voltage waveform 180. Both switching devices 168 and 170 are not turned on simultaneously because simultaneous on states would result in a short circuit of split DC link 164. Thus, it can be seen that the phase voltage Vo has two voltage levels Vdc/2 and −Vdc/2.

Figure 7:
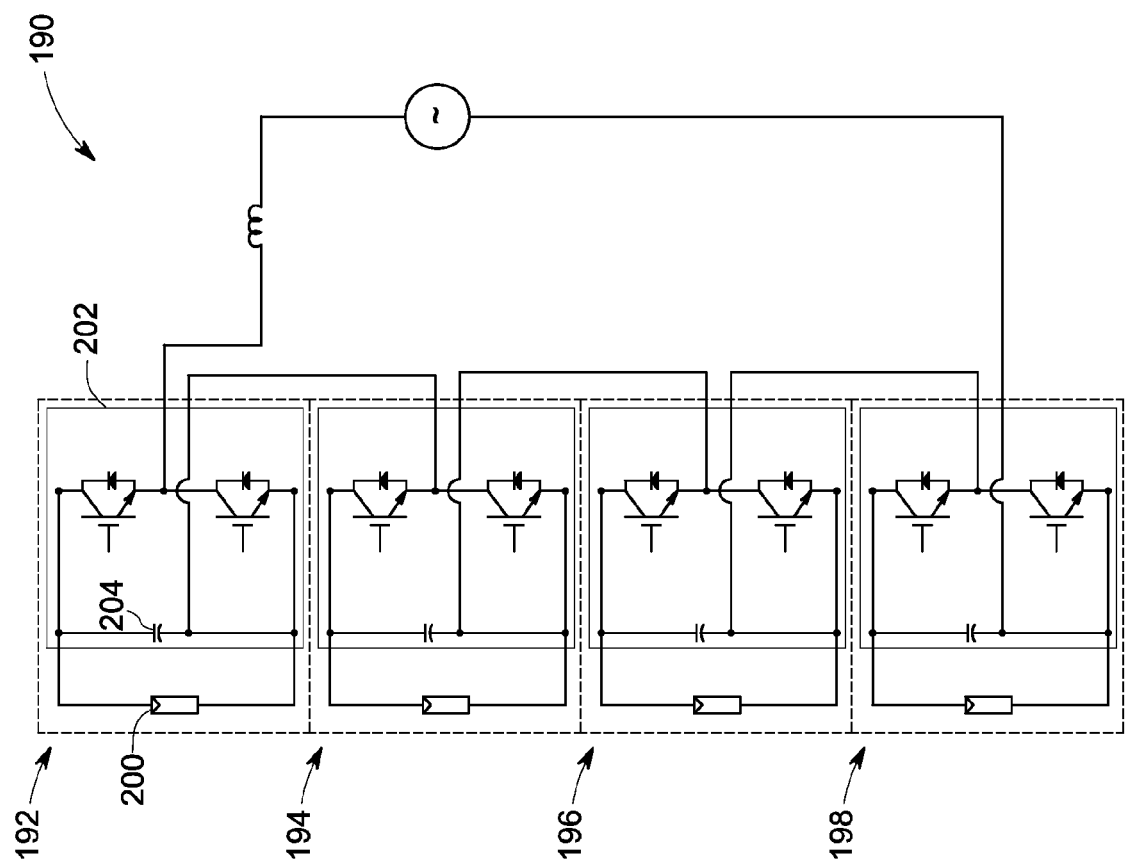
FIG. 7 is a diagrammatical representation of a single phase structure of another power generation system in accordance with an embodiment of the present invention.

FIG. 7 illustrates a single phase structure of a power generation system 190 utilizing integrated PV panels of the type described with respect to FIG. 6 in accordance with an embodiment of the present invention. Power generation system 190 includes a string of a plurality of integrated PV panels 192, 194, 196 and 198 connected in series. In another embodiment, multiple such strings may be connected in parallel for higher currents as discussed above with respect to FIG. 5. In the embodiment of FIG. 7, each integrated PV panel includes a PV module 200 coupled to a half bridge DC to AC converter 202 through a DC link 204. The AC outputs of each of the half bridge converters are connected in series such that the synthesized output voltage is the sum of the half Bridge converter outputs. In one embodiment, individual maximum power point tracking (MPPT) controllers (not shown) are used to determine reference current commands for the half bridge DC to AC converters such that the maximum power is acquired from the PV cells.

One of the advantages of embodiments of the present invention is that no DC to DC converters are required and, in some embodiments, no transformers are required. Also, since the output voltage is near sinusoidal, filter requirements are reduced. Thus, the system has lower cost and higher efficiency. Other advantages of the various embodiments of the present invention are that the series of converter bridges allows for modularized layout and packaging and that redundant voltage levels in the output voltage can be utilized so that the system can still operate even with loss of one of the converters.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power generation system comprising:
   integrated photovoltaic (PV) panels, each integrated PV panel comprising photovoltaic cells, a junction coupler coupling the photovoltaic cells in series, in parallel, or in combinations thereof, output terminals, and a DC to AC converter comprising switching devices coupled between the junction coupler and the output terminals, wherein integrated PV panels are coupled in series at the respective output terminals and wherein an output voltage of each integrated PV panel includes a stepped voltage waveform comprising a positive DC voltage level and a negative DC voltage level; and
   a controller for generating switching command signals for the switching devices to synthesize an output voltage of the power generation system.

2. The power generation system of claim 1, wherein strings of series coupled integrated PV panels are connected in parallel.

3. The power generation system of claim 1 comprising a junction box to hold the junction coupler and the DC to AC converter.

4. The power generation system of claim 1, wherein the switching devices comprise silicon carbide devices.

5. The power generation system of claim 1, wherein the DC to AC converter comprises a H-Bridge DC to AC converter or a half bridge DC to AC converter.

6. The power generation system of claim 5, wherein an output voltage of the H-Bridge DC to AC converter comprises a three level stepped voltage waveform including positive DC voltage, negative DC voltage, and zero voltage levels.

7. The power generation system of claim 6, wherein durations for each of the voltage levels for each of the H-Bridge DC to AC converters are varied over a period of time.

8. The power generation system of claim 5, wherein an output voltage of the power generation system is given by m=2s+1, wherein m is a number of levels in output voltage of the H-Bridge DC to AC converter and s is a number of integrated PV panels in the power generation system.

9. The power generation system of claim 1, wherein the controller comprises a maximum power point tracking controller.

10. The power generation system of claim 1 wherein the power generation system comprises a three phase power generation system.

11. The power generation system of claim 10, wherein the power generation system comprises three strings of the series connected integrated PV panels.

12. The power generation system of claim 11, wherein output terminals of the three strings are connected in a star arrangement or a delta arrangement.

13. The power generation system of claim 1 comprising transformer-less connection to a power grid.

14. A photovoltaic (PV) energy power system installation method, comprising:
   connecting integrated PV panels in series, each integrated PV panel including photovoltaic cells, a junction coupler coupling the photovoltaic cells in series, in parallel, or in combinations thereof, output terminals, and a DC to AC converter comprising switching devices coupled between the junction coupler and the output terminals; and
   coupling the connected integrated PV panels to a grid or a load;
   wherein an output voltage of each integrated PV panel includes a stepped voltage waveform comprising a positive DC voltage level and a negative DC voltage level.

15. The power generation system of claim 1, wherein the stepped voltage waveform comprises a pulse width modulated voltage waveform.

* * * * *